(12) United States Patent
Khouri

(10) Patent No.: US 7,219,957 B1
(45) Date of Patent: May 22, 2007

(54) VEHICLE SEAT WITH ARTICULATING CUSHION COMPONENT

(75) Inventor: Michel G. Khouri, Birmingham, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 11/266,203

(22) Filed: Nov. 4, 2005

(51) Int. Cl.
*B60R 21/00* (2006.01)
(52) U.S. Cl. .................................................. 297/216.1
(58) Field of Classification Search ........... 297/216.12, 297/216.14, 470, 485, 488, 467, 465, 256.15, 297/216.1, 284.11, 472, 216.15, 284.9, 219.12, 297/256.17; 280/753, 730.1, 751
See application file for complete search history.

(56) References Cited

U.S. PATENT DOCUMENTS

| | | | |
|---|---|---|---|
| 5,251,931 A * | 10/1993 | Semchena et al. ....... | 280/730.1 |
| 5,340,185 A | 8/1994 | Vollmer | |
| 5,551,749 A * | 9/1996 | Reher et al. ............ | 297/219.12 |
| 5,567,006 A * | 10/1996 | McCarthy .............. | 297/216.15 |
| 5,641,200 A * | 6/1997 | Howell .................. | 297/256.17 |
| 5,730,458 A * | 3/1998 | Byon ...................... | 280/730.2 |
| 5,806,923 A * | 9/1998 | Tschaschke et al. ... | 297/216.13 |
| 6,033,017 A | 3/2000 | Elqadah et al. | |
| 6,142,563 A | 11/2000 | Townsend et al. | |

* cited by examiner

*Primary Examiner*—Milton Nelson, Jr.
(74) *Attorney, Agent, or Firm*—Foley and Lardner LLP

(57) ABSTRACT

An articulated seat cushion component for the seat of a vehicle may include a seat cushion component, wherein the seat cushion component is arranged to detach from a seat cushion of the seat and to be positioned between an occupant of the seat and an intruding body structure. The seat cushion component may be arranged to be integral with the seat cushion of a vehicle seat during when the seat cushion component is in an undeployed state. The seat cushion component may be arranged so that when the seat cushion component is deployed the seat cushion component detaches from the seat cushion of the seat of a vehicle and is positioned to protect a vehicle occupant during a side crash.

12 Claims, 3 Drawing Sheets

VEHICLE SEAT WITH ARTICULATING CUSHION COMPONENT

BACKGROUND

The present invention relates to an articulating seat cushion component for protecting an occupant of a vehicle during a side crash. The present invention further relates to an articulating seat cushion component for protecting the thorax, abdomen, and pelvis of a vehicle occupant from vehicle intrusion during a side crash, by pushing on the occupant's pelvis.

During a side crash, an impact upon the side of a vehicle may cause the vehicle to push in towards the interior of the vehicle. Intrusion of the vehicle body structure during a side crash is a particular concern in smaller vehicles because the style of the vehicle may cause the gap between the side of the vehicle and an occupant's seat to be minimized.

To protect a vehicle occupant from intrusion by the vehicle body structure, crashes must be detected at a fast rate and protective devices, such as airbags, must be rapidly deployed to the proper position. This need for a rapid rate of responsiveness and a stiff component that can be reversibly positioned presents a challenge for protecting vehicle occupants during side crashes.

SUMMARY OF THE INVENTION

It is an object of at least one embodiment of the present invention to provide an articulating seat cushion component for protecting a vehicle occupant during a side crash. More particularly, it is an object of the present invention to provide protection to a vehicle occupant's pelvis, abdomen, and/or thorax during a side crash.

It is also an object of at least one embodiment of the present invention to provide an alternative or a supplement to side airbags for protecting a vehicle occupant from push in of the vehicle structure during a side crash.

According to an embodiment of the present invention, a seat cushion component for the seat of a vehicle may include a seat cushion component, wherein the seat cushion component is arranged to detach from a seat cushion of the seat and to be positioned between an occupant of the seat and an intruding body structure.

According to an embodiment of the present invention, a seat for an occupant of a vehicle may include a seat, which includes a seat cushion, and a seat cushion component, wherein the seat cushion component is arranged to detach from the seat cushion and to be positioned between an occupant of the seat and an intruding body structure.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Embodiments of the present invention will be described below with reference to the drawings.

Figure 1:
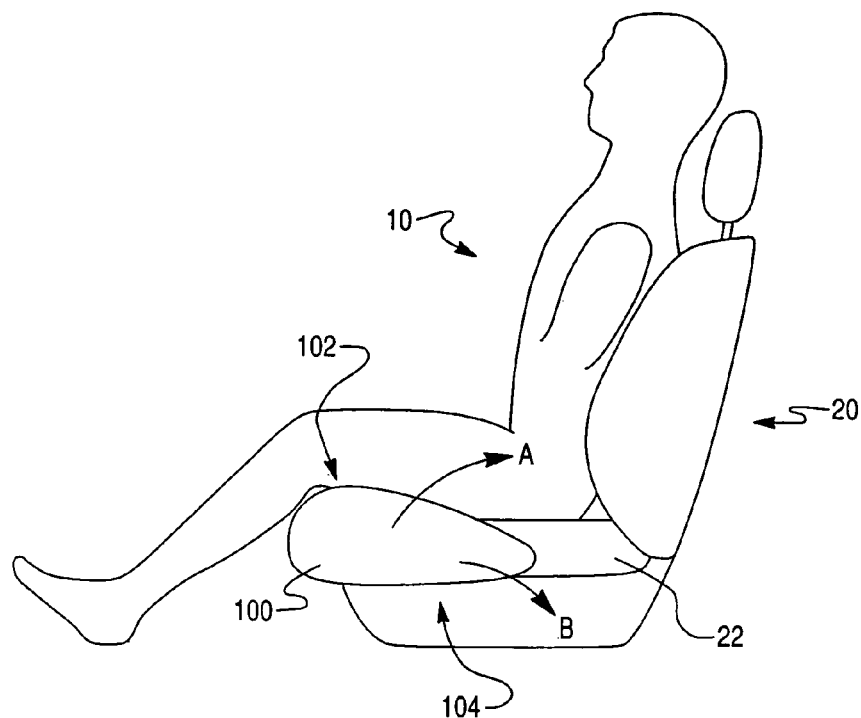
FIG. 1 is a side view of a vehicle seat with an articulated seat cushion component in an undeployed state, according to an embodiment of the present invention.

FIG. 1 shows a side view of a vehicle seat 20 with an articulated seat cushion component 100 in an undeployed state, according to an embodiment of the present invention. The vehicle seat 20 may be any conventional type of vehicle seat, including bucket seats, for a vehicle occupant 10 to be seated in.

According to an embodiment of the present invention, the seat cushion component 100 may be arranged so that the seat cushion component 100 is part of a bottom seat cushion 22. In this way, the seat cushion component 100 forms a part of the bottom seat cushion 22 during normal use of the seat 20 when the seat cushion component 100 is not deployed. The seat cushion component 100 may be arranged so that the seat cushion component 100 is integral to the seat 20.

The seat cushion component 100 may be covered by the fabric covering the bottom seat cushion 22 so that when the seat cushion component 100 deploys, the seat cushion component 100 moves within the fabric or tears free of the fabric. In another example, the seat cushion component 100 may be a separate cushion adjacent to the bottom seat cushion 22 that is also joined to the bottom seat cushion 22. For example, the seat cushion component 100 may be joined to the bottom seat cushion 22 by stitching. When the seat cushion component 100 is joined to the bottom seat cushion 22 by stitching, the seat cushion component 100 tears the stitching during deployment in an emergency situation so that the seat cushion component 100 detaches from its position with the bottom seat cushion 22.

The seat cushion component 100 may be used to support a vehicle occupant 10 or to aid in the positioning of a vehicle occupant 10 in the seat 20. For example, the seat cushion component 100 may be used in a bucket seat to form a cushion component of the bottom seat cushion 22 that is arranged to maintain the position of the vehicle occupant 10 by preventing the vehicle occupant 10 sliding in a lateral direction on the bottom seat cushion 22.

When an emergency situation occurs, the seat cushion component 100 may be arranged to deploy so that the seat cushion component 100 moves to a position between the vehicle occupant 10 and the side of the vehicle. For example, the seat cushion component 100 may be deployed so that the seat cushion component 100 is positioned to protect the vehicle occupant 10 during a side crash so that injuries to the pelvis, thorax, and/or abdomen of the vehicle occupant 10 may be prevented.

The seat cushion component 100 may be constructed so that the seat cushion component 100 is made of conventional materials used for seat cushions in vehicles. In another embodiment, the seat cushion component 100 may be constructed of specialized energy absorbing materials or a combination of energy-absorbing materials and conventional cushion materials. The seat cushion component 100 may be reinforced with structures to provide added strength to the seat cushion component 100 in its deployed position.

The seat cushion component 100 may be arranged so that the seat cushion component 100 deploys in the directions indicated by arrow A and arrow B in FIG. 1. For example, the seat cushion component 100 may be arranged so that a rear portion 104 of the seat cushion component 100 slides in the direction indicated by arrow B, while a forward portion 102 of the seat cushion component 100 pivots along the direction indicated by arrow A. By deploying the seat cushion component 100 in this manner, the seat cushion component 100 may be moved from an undeployed position to a deployed position rapidly in an emergency situation.

Other deployment motions or directions may be used to deploy the seat cushion component 100. For example, the seat cushion component 100 may be deployed by pivoting the seat cushion component 100 about a point in the rear portion 104 of the seat cushion component 100.

Figure 2:
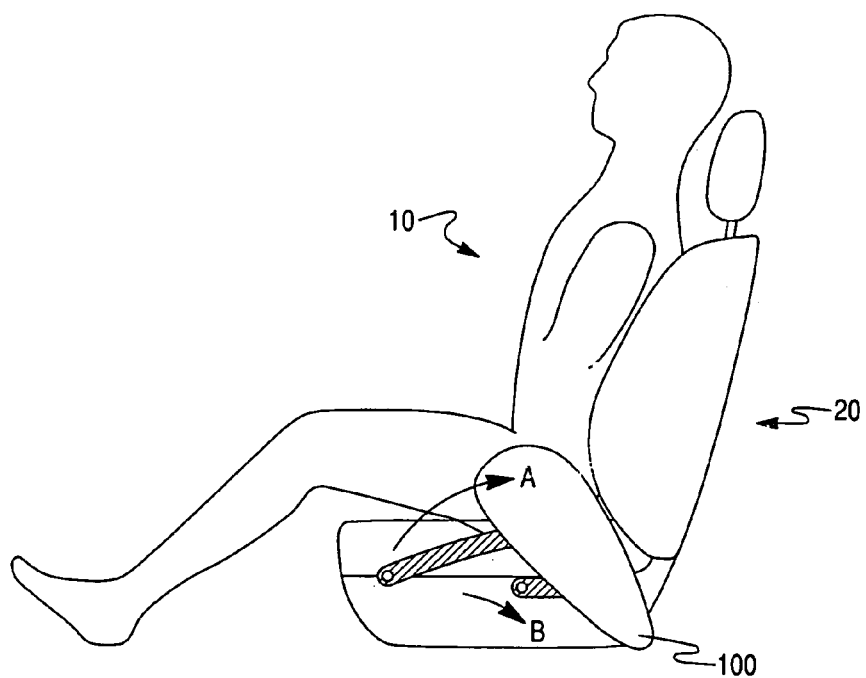
FIG. 2 is a side view of a vehicle seat with an articulated seat cushion component in a deployed state, according to an embodiment of the present invention.

FIG. 2 shows a side view of a vehicle seat 20 with the articulated seat cushion component 100 in a deployed state, according to an embodiment of the present invention. As shown in FIG. 2, the seat cushion component 100 may be arranged to pivot and slide along the directions indicated by arrow A and arrow B, respectively.

In the example of FIG. 2, the seat cushion component 100 has deployed to a position along the side of the vehicle occupant 10 so that the seat cushion component 100 may aid in the protection of the vehicle occupant during a side crash. In this position, the seat cushion component 100 may aid in the protection of a vehicle occupant 10 from push-in due to the side of the vehicle intruding into the interior of the vehicle where the vehicle occupant 10 is seated.

Figure 3:
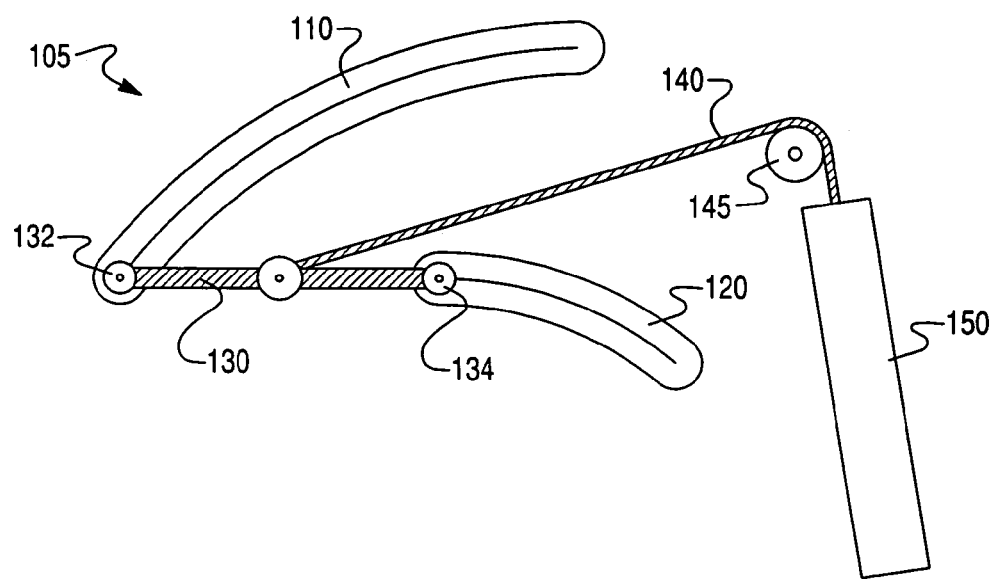
FIG. 3 is a side view of a deployment system for an articulated seat cushion component in an undeployed state, according to an embodiment of the present invention.

FIG. 3 is a side view of a deployment system 105 for the articulated seat cushion component 100, according to an embodiment of the present invention. The seat cushion component 100 is not shown in FIG. 3 in order to illustrate the structure and movement of the deployment system 105. In the example of FIG. 3 the deployment system 105 is in an undeployed state so that the seat cushion component would also be in an undeployed position, such as in the example of FIG. 1.

According to an embodiment of the present invention, the deployment system 105 for the seat cushion component 100 may include a pair of slots 110, 120 for a bar 130 to travel along. The slots 110, 120 may be attached to the seat 20 to fix the slots 110, 120 in place. The ends 132, 134 of the bar 130 may be connected to the slots 110, 120 so that the bar 130 may slide along the slots 110, 120. The bar 130 is connected to the seat cushion component 100 so that when the bar 130 moves along the slots 110, 120, the seat cushion component 100 also moves in the same direction as the bar 130.

The deployment system 105 may further include a cable 140 that connects the bar 130 to an actuator 150. When an emergency situation occurs, the actuator 150 may be activated, causing the cable 140 to retract and pull the bar 130 along the slots 110, 120. A roller 145 may be positioned to support the cable 140 between the actuator 150 and the bar 130, and to facilitate movement of the cable 140 and to allow the cable 140 to change direction.

Figure 4:
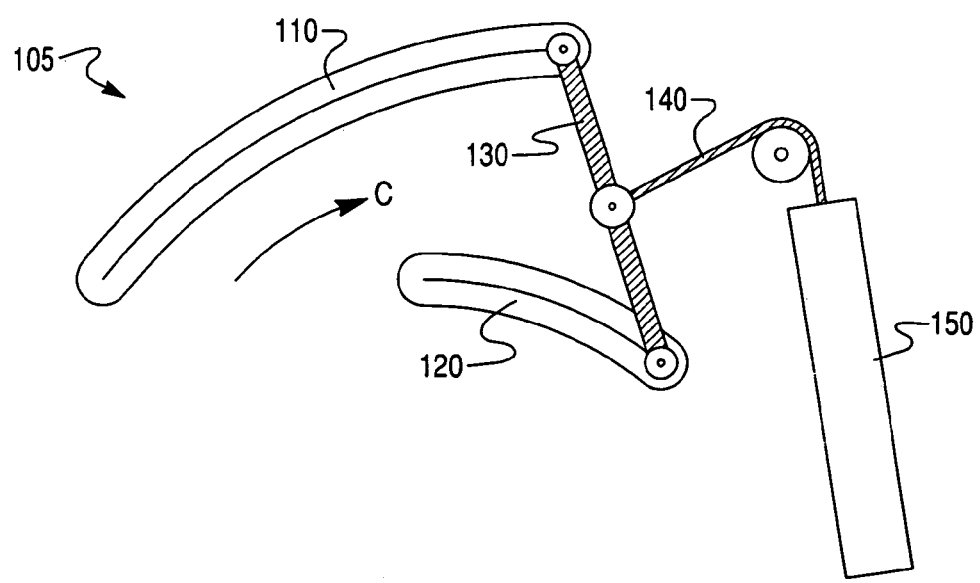
FIG. 4 is a side view of a deployment system for an articulated seat cushion component in a deployed state, according to an embodiment of the present invention.

FIG. 4 is a side view of the deployment system 105 for the articulated seat cushion component 100 in a deployed state, according to an embodiment of the present invention. In the example of FIG. 4, the actuator 150 has been activated, causing the cable 150 to retract and pull the bar 130 along the slots 110, 120 in the direction generally indicated by arrow C. Once the bar 130 has reached the ends of the slots 110, 120, the bar 130 and the seat cushion component 100 have attained a deployed position.

According to an embodiment of the present invention, the actuator 150 may be any suitable device for retracting the cable 140 or moving the bar 130 into a deployed position. For example, the actuator 150 may be a pyrotechnic device, a piston-cylinder device, spring device, or other suitable device for rapidly deploying the seat cushion component 100.

Figure 5:
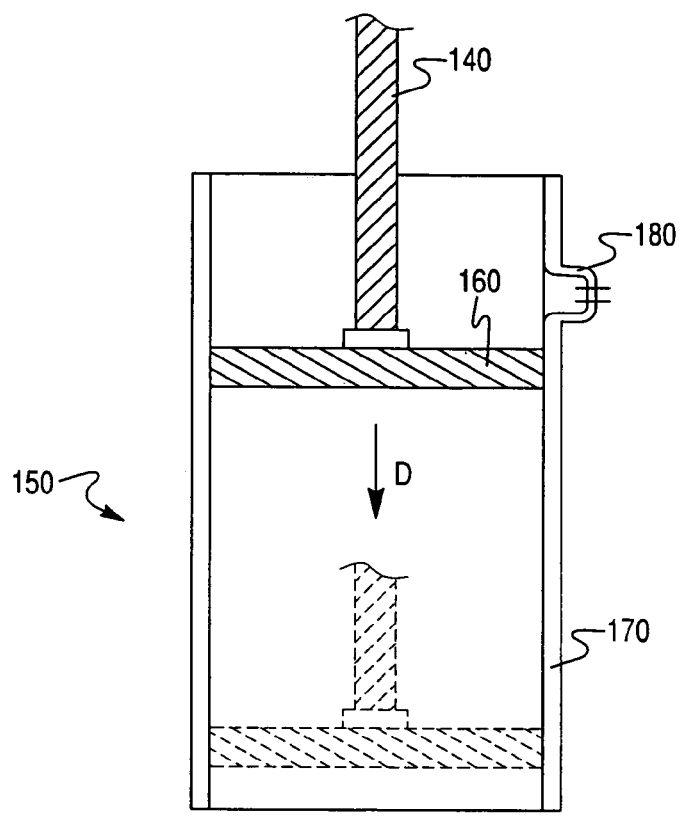
FIG. 5 is a sectional view of an actuator for deploying an articulated seat cushion component, according to an embodiment of the present invention.

FIG. 5 is a sectional view of an actuator 150 for deploying the seat cushion component 100, according to an embodiment of the present invention. In the example of FIG. 5, the actuator 150 is a pyrotechnic device that includes a piston or plate 160 that is arranged to move within a side wall 170 of the actuator 150. The cable 140 is attached to the piston 160 so that when the piston 160 moves in the direction indicated by arrow D, the cable 140 retracts and causes the bar 130 to move along the slots 110, 120.

Figure 6:
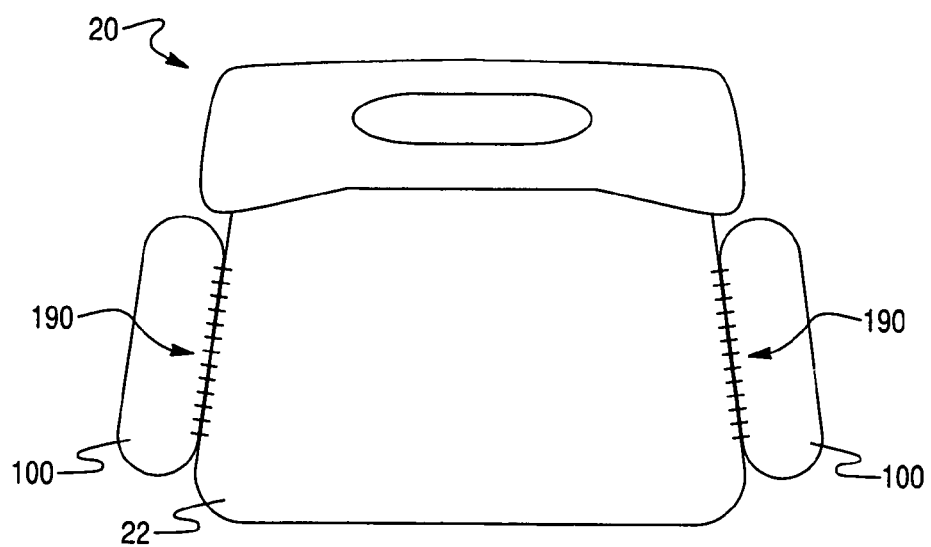
FIG. 6 is a top view of a vehicle seat with an articulated seat cushion component that is stitched to a seat cushion, according to an embodiment.

FIG. 6 shows a top view of a vehicle seat 20 in which the seat cushion components 100 are stitched to the bottom seat cushion 22. For example, the seat cushion components 100 may be joined to the bottom seat cushion 22 by stitching.

According to another embodiment of the present invention, the seat cushion component 100 may be activated by a device that connects the seat cushion component 100 to the B-pillar of a vehicle, which during an emergency, would intrude towards the vehicle occupant and pull the seat cushion component 100 into position. The device may be any suitable device for deploying the seat cushion component 100. For example, the device may be a cable and pulley system or other mechanical actuator.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A vehicle seat, comprising:
   a seat cushion forming a seat surface; and
   a deployment system for a seat cushion component, wherein the deployment system includes an actuator and a seat cushion component guiding device, wherein the seat cushion guiding device comprises slots;
   wherein the seat cushion component is connected to a bar that slides within the slots;
   wherein the seat cushion component is adapted to move to a position relative to the seat surface;
   wherein the seat cushion component is adapted to move between an occupant of the seat and a side of the vehicle.

2. The vehicle seat of claim 1, wherein the seat cushion component is arranged to deploy to a position so that the seat cushion component protects the pelvis, thorax, and/or abdomen of the occupant.

3. The vehicle seat of claim 1, wherein the actuator is a pyrotechnic device.

4. The vehicle seat of claim 1, wherein the seat cushion component is stitched to the seat cushion.

5. The vehicle seat of claim 4, wherein the seat cushion component is configured to tear the stitches when the seat cushion component moves to a position relative to the seat surface.

6. A seat for an occupant of a vehicle, comprising:
- a seat, comprising a seat cushion, a portion of the seat cushion, and a seat surface;
- wherein the portion of the seat cushion is adapted to move relative to the seat cushion;
- wherein the portion of the seat cushion is adapted to move to a position between an occupant of the seat and a side of the vehicle;
- wherein the portion of the seat cushion is stitched to the seat cushion;
- further comprising a deployment system for the portion of the seat cushion, wherein the deployment system includes an actuator and a seat cushion portion guiding device.

7. The seat of claim 6, wherein the seat cushion portion guiding device includes slots.

8. The seat of claim 7, wherein the seat cushion portion is connected to the slots.

9. The seat of claim 7, wherein the seat cushion portion is connected to a bar that slides within the slots.

10. The seat of claim 6, wherein the actuator is a pyrotechnic device.

11. The seat of claim 6, wherein the seat is a bucket seat.

12. A seat for an occupant of a vehicle, comprising:
- a seat, comprising a seat cushion, a portion of the seat cushion, and a seat surface;
- wherein the portion of the seat cushion is adapted to move relative to the seat cushion;
- wherein the portion of the seat cushion is adapted to move to a position between an occupant of the seat and a side of the vehicle;
- wherein the portion of the seat cushion is stitched to the seat cushion;
- wherein the seat cushion portion is configured to tear the stitches when the seat cushion portion moves to the position between the occupant of the seat and the side of the vehicle.

* * * * *